United States Patent

Schlenk

[11] Patent Number: 5,172,920
[45] Date of Patent: Dec. 22, 1992

[54] COMPOSITE MATERIAL FOR GASKETS

[75] Inventor: Walter Schlenk, Nuremberg, Fed. Rep. of Germany

[73] Assignee: Diamond Manufacturing Co., Wyoming, Pa.

[21] Appl. No.: 827,016

[22] Filed: Jan. 28, 1992

[51] Int. Cl.$^5$ ............................................. F16J 15/12
[52] U.S. Cl. ............................. 277/235 R; 277/227; 277/235 A
[58] Field of Search ............. 277/235 R, 235 B, 227, 277/235 A, 233

[56] References Cited

U.S. PATENT DOCUMENTS

| | | |
|---|---|---|
| 1,897,088 | 2/1933 | Victor ........................ 277/235 B |
| 1,904,651 | 4/1933 | Victor ........................ 277/235 B |
| 1,911,484 | 5/1933 | Victor ........................ 277/235 B |
| 1,927,450 | 9/1933 | Balfe ........................ 277/235 B |
| 1,968,365 | 7/1934 | Bailey ........................ 277/235 B |
| 1,997,987 | 4/1935 | Victor, Jr. ........................ 277/235 B |
| 2,026,854 | 1/1936 | Victor ........................ 277/235 B |
| 2,211,045 | 8/1940 | Balfe ........................ 277/235 B |
| 2,992,151 | 7/1961 | Niessen ........................ 277/235 B |
| 3,970,322 | 7/1976 | Stecher et al. ........................ 277/235 B |
| 4,234,638 | 11/1980 | Yamazoe et al. ........................ 277/235 B |
| 4,591,170 | 5/1986 | Nakamura et al. ........................ 277/235 B |
| 4,748,075 | 5/1988 | Beyer et al. ........................ 277/235 B |
| 4,776,602 | 10/1988 | Gallo ........................ 277/235 B |
| 4,822,062 | 4/1989 | Gallo et al. ........................ 277/235 B |
| 4,852,893 | 8/1989 | Westey ........................ 277/235 B |

FOREIGN PATENT DOCUMENTS 2701603  7/1978  Fed. Rep. of Germany ... 277/235 B

*Primary Examiner*—William A. Cuchlinski, Jr.
*Assistant Examiner*—D. DePumpo
*Attorney, Agent, or Firm*—Michael Ebert

[57] ABSTRACT

A composite material usable for producing gaskets, the composite material being composed of a perforated metal core sheet sandwiched between facing layers having sealing properties and compression-laminated thereto. The core sheet is provided with a uniform array of square holes, each bordered by a set of four triangular tangs whose apex portions are flared outwardly with respect to the hole, the tang sets from alternate holes projecting from one side of the core sheet and the tang sets from the other holes projecting from the other side thereof. When the sandwich is subjected to compression, the tang sets on opposite sides of the core sheet then pierce the related layers and are caused to bend downwardly and thereby clinch the layers to the core sheets whereby the tang sets are then being embedded within the layers, each tang set affording an omnidirectional holding force.

9 Claims, 1 Drawing Sheet

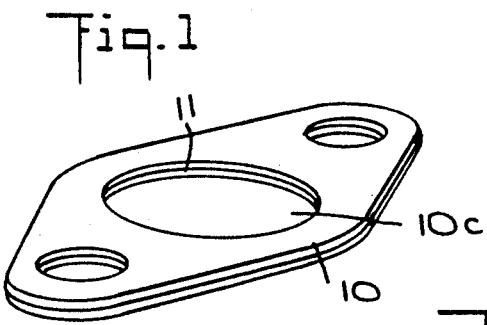
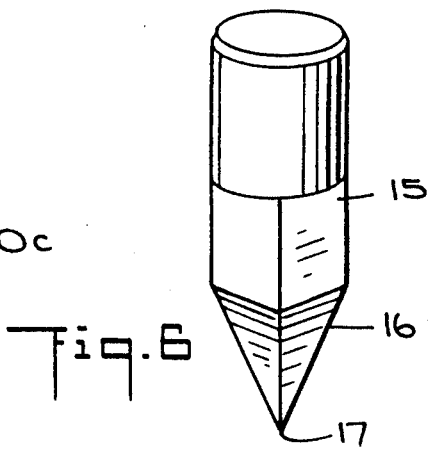
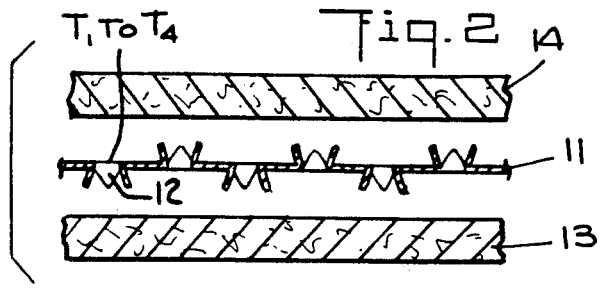
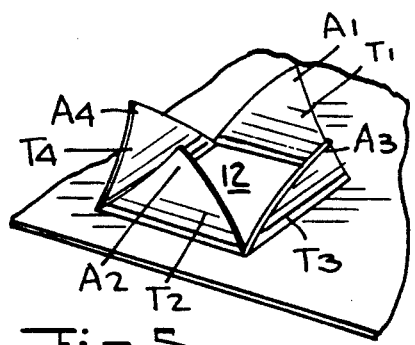
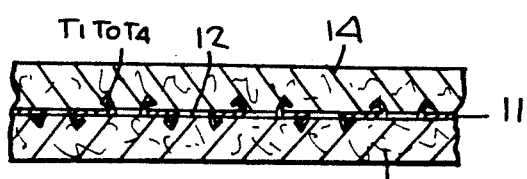
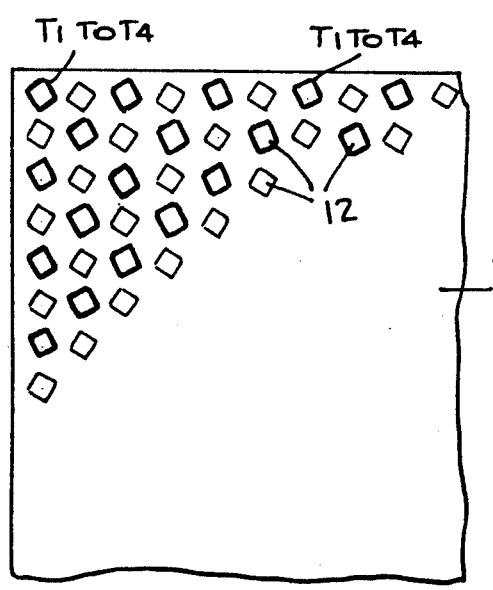
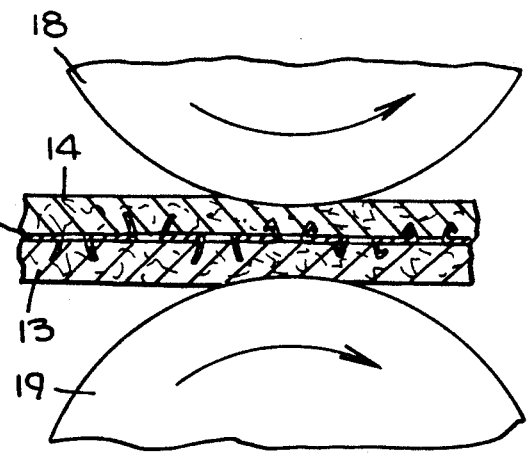

COMPOSITE MATERIAL FOR GASKETS

BACKGROUND OF THE INVENTION

1. Field of the Invention

This invention relates generally to gaskets for making joints fluid-tight, and more particularly to a composite material suitable for making gaskets in any desired configuration, the composite material being composed of a perforated metal sheet having tangs struck out therefrom sandwiched between facing layers having sealing properties and compression laminated thereto.

2. Status of Prior Art

A gasket is a packing used to prevent leakage of fluid through mechanical joints. Gaskets are commonly installed in static clearances between parallel flanges, sealing being effected by compressive loading by means of bolts. Gaskets come in a variety of forms, such as simple ring gaskets made of rubber, a rubberized asbestos cloth, or a corrugated sheet with a filling in the corrugations.

The concern of the present invention is with gaskets which are formed of a composite material composed of a metal core and facing layers having sealing properties laminated thereto, the composite being die cut or otherwise shaped to define a gasket of the desired configuration. One such composite material is disclosed in the Victor U.S. Pat. No. 1,897,088, in which a metal sheet having triangular prongs struck out of the sheet on opposing sides thereof is sandwiched between facing layers of asbestos material. The sandwich is first fed between soft compression rolls which cause the prongs to pierce through and stick out of the asbestos layers. Then the sandwich is fed between hard compression rolls which act to bend over the points of the prongs to cause them to clinch the asbestos layers.

In the Victor arrangement, each punched hole in the metal core has a triangular form, the punching action creating for each hole a single straight triangular tang. As a consequence, the holding power of the tangs is limited.

A similar gasket composite is disclosed in the Balfe U.S. Pat. No. 1,927,450, in which a metal core having straight triangular prongs or tangs struck out from the holes, one for each hole, project from the opposite sides of the metal core, the tangs penetrating packing layers and being clinched over these layers.

In the gasketing material shown in the Niessen et al. U.S. Pat. No. 2,992,151, the core is a sheet of metal that has been expanded laterally to produce closely-spaced projections rising out of each side of the core sheet, the core sheet being compressed between layers of elastomeric material whereby the projections from the core sheet penetrate these layers.

In Nakamura et al., 4,591,170, the metal core sheet of the composite gasketing material is so punched as to create tangs each having three points thereon. These multi-pointed tangs penetrate facing layers of heat-resistent sealing material, such as asbestos or graphite. The Yamazoe et al. U.S. Pat. No. 4,234,638 also discloses a composite material for gaskets in which prongs projecting from opposite sides of a core sheet penetrate graphite facing layers.

In the Gallo U.S. Pat. No. 4,776,602 and the Gallo et al. U.S. Pat. No. 4,822,062, the gasket is formed from a perforated metal core sheet joined to facing layers. The retaining means for this purpose are formed by a pair of opposed tangs on opposite sides of each perforation in the core sheet.

Gaskets have innumerable applications, for they are used in automobile and other engines, in chemical and industrial apparatus, nuclear reactors, and in various mechanisms where the gaskets may be subjected to elevated temperatures and highly reactive chemical fluids.

Thus desirable in such applications as the sealing or packing layers of a gasket is Kevlar, this being the trademark for an aromatic polyamide fiber of extremely high tensile strength whose resistance to elongation is greater even than steel. Kevlar is usable as a reinforcing material for plastic composite. Also usable as a sealing layer is Teflon, which is the trademark for tetrafluoroethylene, a fluorocarbon which is available in fibrous or in sheet form.

Some high-strength cellulosic materials are also usable as packing layers. But whether the layers are of Kevlar, Teflon, graphite, or of a cellulosic composition, it is essential that these layers be securely laminated to the metal core sheet, and that no chemical bonding agent be used for this purpose, for such agents may be attacked by highly reactive fluids.

When a composite for a gasket is composed of Kevlar layers compression-laminated to opposite sides of a perforating metal core sheet whose sharp prongs or tangs pierce the Kevlar layers, then it is not only important that the tangs function to securely lock the layers to the core sheet to prevent delamination of the composite material, but also that the tangs be embedded within the Kevlar layers and not go through the outer surfaces of these layers. Should the points of the tangs which pierce the Kevlar layers extend beyond the outer surface of the Kevlar layers, the integrity of the Kevlar as a chemically resistant sealing barrier would be impaired.

SUMMARY OF INVENTION

In view of the foregoing, the main object of this invention is to provide a composite material usable for making gaskets of any desired configuration, the composite being composed of a perforated metal core sheet having tangs projecting from opposite sides thereof sandwiched between facing layers having sealing or packing properties which are compression-laminated to the core sheet whereby the tangs are then so embedded in the layers as to strongly resist delamination of the composite.

More particularly, an object of this invention is to provide a composite material of the above-noted type in which the square holes in the core sheet are each bordered by a set of four rectangular tangs which pierce the related layer of sealing material and are embedded therein to effect a strong mechanical interlock between the layer and the core sheet at each hole site.

Also an object of the invention is to provide a composite of the above-noted type whose layers are formed of Kevlar, asbestos, graphite, or other sealing materials, and whose tang sets are so embedded in these layers as not to impair their outer surfaces.

Yet another object of this invention is to provide a gasket composite which can be mass produced at relatively low cost.

Briefly stated, these objects are attained in a composite material usable for producing gaskets, the composite material being composed of a perforated metal core sheet sandwiched between facing layers having sealing properties and compression-laminated thereto. The core sheet is provided with a uniform array of square holes, each bordered by a set of four triangular tangs whose apex portions are flared outwardly with respect to the hole, the tang sets from alternate holes projecting from one side of the core sheet and the tang sets from the other holes projecting from the other side thereof.

When the sandwich is subjected to compression, the tang sets on opposite sides of the core sheet then pierce the related layers and are caused to bend downwardly and thereby clinch the layers to the core sheet whereby the tang sets are then fully embedded within the layers, each tang set affording an omnidirectional holding force.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is an example of a simple gasket made from a composite material in accordance with the invention;

FIG. 2 is an expanded view of the three components of the composite material;

FIG. 3 shows the components after compression lamination;

FIG. 4 is a plan view of the perforated core sheet included in the composite;

FIG. 5 illustrates the punch used to perforate the core sheet;

FIG. 6 shows a set of four tangs which are struck out of the core sheet by the puncher; and FIG. 7 illustrates the effect of compression when the core sheet sandwiched between the sealing layers is fed between compression rolls.

DESCRIPTION OF INVENTION

Referring now to FIG. 1, there is shown by way of example only, a simple gasket 10 formed of composite material in accordance with the invention adapted to seal a single joint, such as that created by two pipes having end flanges provided with bolt holes. Gasket 10, whose shape corresponds to that of the flanges, is interposed between the pipe end flanges and is compressed by bolts which go through the flange holes and into the corresponding holes 10A and 10B in the gasket. The center hole 10C in gasket 10 matches the internal diameter of the joint pipes, the gasket preventing fluid leakage at the joints.

In practice, the composite material is die cut or otherwise shaped to define a gasket of any desired configuration. The packing characteristics of the sealing layers and the thickness of these layers are appropriate to the end use of the gasket. Hence in those applications requiring a gasket resistant to chemically reactive fluids or to elevated temperatures, materials appropriate to this application must be included in the composite.

As shown in FIGS. 1 to 4, the composite material from which the gasket is made is constituted by a thin metal core sheet 10 of stainless steel, tin plate or other suitable material which lends itself to perforation in the manner to be disclosed. The core sheet is punched to create a uniform array of equi-spaced square holes 12 from which a set of triangular tangs $T_1$, $T_2$, $T_3$ and $T_4$ are struck out which border the square, as shown in separately in FIG. 5. The apex portions $A_1$ to $A_4$ of the triangular tangs are flared outwardly to create hook-like projections.

The metal core sheet 11 is so punched that tang sets $T_1$ to $T_4$ struck out of alternate holes in the array project from one side of the sheet, and the tang sets struck out of the other holes in the array project from the other side of the sheet, each set representing a hole site.

Core sheet 11 is sandwiched between top and bottom layers 13 and 14 having suitable packing or sealing properties, such as graphite, Kevlar, asbestos, or a packing material having similar physical and chemical properties.

Layers 13 and 4 are compression laminated to the metal core sheet 11, such that, as shown in FIG. 3, the tangs of each set pierce the related layer and the compressive force which is exerted on the flared apex portions acts to bend the tangs downwardly to securely clinch the layer to the core sheet at each hole site. The length of the tangs in each set relative to the thickness of layers 13 and 14 is such that while the tangs pierce these layers, their apex portions or points do not exit from the outer surfaces of the layers but fall short of these surfaces. And when the tangs are bend downwardly by a compressive force, then the tangs in each set are embedded in the layer and assume a four lobe configuration thereon to mechanically lock the layer securely to the core sheet at each hole site, the locking or holding force being omnidirectional.

In practice, for certain applications the length of the tangs relative to the thickness of the layers may be such that the points of the tangs go through and extend beyond the surface layers, and are then bent down to engage these surfaces. This is appropriate to a situation in which the layers are thin, the bent tangs then affording a stronger clinching action.

The resultant lamination of the layers at the multiplicity of hole sites of the core sheet is so strong that the composite material is highly resistant to delamination. And because the tangs are all buried within the packing layers, the sealing integrity of the layers are not disturbed thereby.

To produce the desired set of four tangs at each hole in the core sheet, a preferred form of punch 15 for this purpose is shown in FIG. 6. Punch 15 is provided with a tip 16 having a four-sided pyramidical configuration whose peak 17 is applied to the center of the square hole to be punched in the sheet metal, the tip striking out four tangs $T_1$ to $T_4$ whose triangular form corresponds to the four triangles of the pyramid.

In order to have the apex portions of the triangular tangs flare outwardly with respect to the square hole, the square hole in the platen on which the core sheet is supported is somewhat larger than the base of the pyramid on the tip of the punch to provide clearance therebetween. Formed on the wall of the platen hole is a square ridge or bead which engages the tangs struck out of the square hole in the core sheet, and causes the apex portion of the tangs to flare out in the clearance region below the ridge.

When, as shown in FIG. 7, the sandwich composed of core sheet 11 and layers 13 and 14 are fed between rotating compression rolls 18 and 19, tangs $T_1$ to $T_4$ bordering the holes 12 in the core sheet and projecting from opposite sides of the core sheet are caused by the compressive force to pierce these layers, the force being applied to the flared out apex portions of the tangs to cause the metal tangs to bend downwardly. Because the layers 13 and 14 are formed of fibrous material or of resilient synthetic plastic material, the material yields to the bending action of the tangs which effect a clinching action to hold the layers securely to the core sheet at each hole site.

While there have been shown and described preferred embodiments of composite material for gaskets in accordance with the invention, it will be appreciated that many changes and modifications may be made therein without, however, departing from the essential spirit thereof. Thus each gasket may be provided with a metal frame engaging the periphery of the gasket composite material. And while there has been disclosed a perforated metal core sheet in which tang sets project from both sides of the sheet, in practice the tang sets may all project from only one side of the sheet. In that arrangement, a single layer of sealing material is clinched by the tang sets to the metal core sheet to provide a one-sided gasket.

I claim:

1. A composite material usable for forming gaskets, said material comprising:
   (a) a perforated metal core sheet having square holes punched therein, each hole being bordered by a set of four triangular tangs whose apex portions are flared outwardly with respect to the hole, the sets projecting from at least one side of the sheet; and
   (b) a non-metallic facing layer having sealing properties compression laminated to said one side of the core sheet, whereby the tangs pierce the layer and are bent back downwardly onto the facing layer by a compressive force applied to the apex portions to create four lobes that clinch the layer to the core sheet omnidirectionally and thereby mechanically lock the layer securely thereto.

2. A composite material as set forth in claim 1, wherein said core sheet has a uniform array of square holes punched thereon, said holes in the array each having a diamond formation, the corners of which are in axial alignment with the corners of adjacent holes, the tang sets from alternate holes in the array projecting from one side of the sheet, the sets from the other holes projecting from the other side thereof and a second facing layer compression laminated to the other side of the sheet.

3. A composite material as set forth in claim 1, wherein said core sheet is formed of stainless steel.

4. A composite material as set forth in claim 1, wherein said layers are formed of fibrous material.

5. A composite material as set forth in claim 4, wherein said layers are formed of asbestos.

6. A composite material as set forth in claim 1, wherein said layers are formed of a graphite composition.

7. A composite material as set forth in claim 1, wherein said layers are each formed of resilient, synthetic material having a predetermined thickness, and said tangs are shorter than said thickness so that the apex portions do not exit from the layers and therefore do not disturb their sealing integrity.

8. A composite material as set forth in claim 1, wherein said material is die cut to assume a desired gasket configuration.

9. A composite material as set forth in claim 1, wherein said holes are created by a punch whose tip has a four-sided pyramidical configuration that is projected through the core sheet into a platen having a square hole therein to receive the punch, the square hole in the platen having a ridge thereon which engages the triangular tangs struck out of the sheet and causes their apex portions to flare out.

* * * * *